(12) United States Patent
Ueyama et al.

(10) Patent No.: US 9,929,412 B2
(45) Date of Patent: Mar. 27, 2018

(54) SUPPORTED PLATINUM CATALYST AND MANUFACTURING METHOD OF THE SAME

(71) Applicant: Panasonic Corporation, Osaka (JP)

(72) Inventors: Yasuhiro Ueyama, Hyogo (JP); Toshiyuki Kojima, Kyoto (JP); Yasushi Taniguchi, Osaka (JP); Kazunori Kubota; Hideyuki Takahashi, Miyagi (JP); Shun Yokoyama, Miyagi (JP); Kazuyuki Tohji, Miyagi (JP); Shuzo Tsuchida, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 15/141,824

(22) Filed: Apr. 29, 2016

(65) Prior Publication Data

US 2016/0372759 A1 Dec. 22, 2016

(30) Foreign Application Priority Data

Jun. 16, 2015 (JP) .................................. 2015-121272

(51) Int. Cl.
*H01M 4/92* (2006.01)
*B01J 37/03* (2006.01)
(Continued)

(52) U.S. Cl.
CPC ............. *H01M 4/926* (2013.01); *B01J 23/42* (2013.01); *B01J 37/031* (2013.01); *B82Y 30/00* (2013.01); *H01M 2008/1095* (2013.01)

(58) Field of Classification Search
CPC . B01J 23/42; B01J 21/18; B01J 35/006; B01J 35/0066; B01J 35/008; B01J 37/031;
(Continued)

(56) References Cited

U.S. PATENT DOCUMENTS 6,518,217 B2 * 2/2003 Xing ........................ B01J 23/40
429/492
6,815,391 B2 * 11/2004 Xing ........................ B01J 21/18
423/460
(Continued)

FOREIGN PATENT DOCUMENTS

CN 102134263 7/2011
EP 1247574 10/2002
(Continued)

OTHER PUBLICATIONS

The Extended European Search Report dated Aug. 18, 2016 for the related European Patent Application No. 16166961.9.
(Continued)

*Primary Examiner* — Patricia L. Hailey
(74) *Attorney, Agent, or Firm* — Panasonic IP Management; Kerry S. Culpepper (57) ABSTRACT

A manufacturing method of a supported platinum catalyst, includes: generating a platinum group salt solution using platinum group salts and a complexing agent; mixing the platinum group salt solution and a carbon powder dispersion in which carbon powder is dispersed; and adding a reducing agent to a mixed solution of the platinum group salt solution and the carbon powder dispersion, and reducing the platinum group salts to allow the platinum group particles to be supported on the carbon powder.

9 Claims, 5 Drawing Sheets

(51) Int. Cl.
*B01J 23/42* (2006.01)
*B82Y 30/00* (2011.01)
*H01M 8/1018* (2016.01)

(58) Field of Classification Search
CPC .......... B01J 37/04; B01J 37/16; H01M 4/926; B82Y 30/00
USPC ...................................................... 502/185
See application file for complete search history.

(56) References Cited

U.S. PATENT DOCUMENTS

| | | | | |
|---|---|---|---|---|
| 8,993,472 | B2* | 3/2015 | Roller ................. | H01M 4/8642 429/523 |
| 2003/0224926 | A1* | 12/2003 | Xing ........................ | B01J 21/18 502/101 |
| 2005/0003959 | A1* | 1/2005 | Yamamoto ............... | B01J 23/42 502/325 |
| 2007/0155626 | A1* | 7/2007 | Yasuda ................ | B01D 53/945 502/329 |
| 2011/0104588 | A1* | 5/2011 | Kwon .................. | H01M 4/885 429/524 |
| 2011/0123908 | A1 | 5/2011 | Kwon et al. | |
| 2013/0137009 | A1* | 5/2013 | Jin ........................ | H01M 4/926 429/482 |

FOREIGN PATENT DOCUMENTS

| | | |
|---|---|---|
| JP | 3643552 B | 4/2005 |
| JP | 5524761 B | 6/2014 |

OTHER PUBLICATIONS

J.-M. Liu et al: "Preparation of High Performance Pt/CNT Catalysts Stabilized by Ethylenediaminetetraacetic Acid Disodium Salt", Fuel Cells, vol. 7, No. 5, Oct. 1, 2007 (Oct. 1, 2007), pp. 402-407, XP055294532.

Han-Xuan Zhang et al: "Carbon-Supported Pd—Pt Nanoalloy with Low Pt Content and Superior Catalysis for Formic Acid Electro-oxidation", Journal of Physical Chemistry C, vol. 114, No. 14, Apr. 15, 2010 (Apr. 15, 2010), pp. 6446-6451, XP055294841.

Xu et al: "The real role of carbon in Pt/C catalysts for oxygen reduction reaction", Electrochemistry Communications, Elsevier, Amsterdam, NL, vol. 9, No. 5, Apr. 24, 2007 (Apr. 24, 2007), pp. 1002-1006, XP022047095.

* cited by examiner

SUPPORTED PLATINUM CATALYST AND MANUFACTURING METHOD OF THE SAME

TECHNICAL FIELD

The technical field relates to a supported platinum catalyst which can be used as a fuel cell catalyst and a manufacturing method of the same.

BACKGROUND

Fuel cells including a solid polymer type are expected to be used as a next-generation power generating system. A solid polymer fuel cell is particularly expected to be used as a power source for household use and automotive use, from viewpoints of a lower operating temperature and a compact shape compared to those of other fuel cells. Generally, a fuel cell is configured by laminating a plurality of cells and pressurizing and fastening the cells with a fastening member such as a bolt. One cell is configured with a membrane electrode assembly (hereinafter, referred to as an MEA) which is interposed between one pair of plate-shaped conductive separators. The membrane electrode assembly (MEA) of the solid polymer fuel cell is configured by bonding an anode, a cathode, and a polymer electrolyte membrane which is interposed between these electrodes. Fuel gas containing hydrogen is supplied to the anode through a gas diffusion layer having porosity and conductivity, oxidant gas containing oxygen such as air is supplied to the cathode through the gas diffusion layer, and the electrical power generated by an oxidation-reduction reaction occurring in each electrode is taken out. The gas diffusion layer is generally configured by providing a coating layer formed of carbon and a water-repellent material on a surface of a base material formed of carbon fibers. A mixture of a catalyst and a solid electrolyte is generally used as both reaction electrodes, in order to promote the electrochemical reaction. As the catalyst configuring the anode and the cathode, noble metals, particularly a platinum group is used as a catalyst metal, and a supported platinum catalyst in which the platinum group is supported on a carbon material such as carbon black or carbon nanofibers is broadly used. The platinum group is used as the catalyst for the fuel cells because of the activity thereof. That is, the platinum group promotes the electrode reaction of both the anode and the cathode, and has high activity.

With the spread of the fuel cells in recent years, not only excellent activity is required for the solid polymer fuel cell catalyst, but also various improvements, particularly a decrease in an amount of the platinum group used in the catalyst and a decrease in a supported amount to a support, are necessary, and various investigations have been performed.

For example, a method of stirring and mixing a solution of platinum salts and carbon powder so as to allow the platinum group to be supported on the carbon powder has been proposed (for example, see Japanese Patent No. 3643552). However, in this method, it is necessary to perform an alloying step by a high temperature treatment at 1,000° C. in the post-process, and the carbon powder which is a support may be modified due to the high temperature treatment or the supported platinum may be coalesced, and thus, it is difficult to exhibit the performance.

In addition, a method of controlling a particle diameter of a platinum group by mixing a solution of platinum group salts and a complexing agent with each other to form a platinum group complex and allow the platinum group to be supported on carbon powder has been proposed (for example, Japanese Patent No. 5524761). However, even in this method, since it is necessary to perform a thermal treatment at 650° C. to 1,000° C. in the post-process, the carbon powder which is a support may be modified due to the high temperature treatment or the supported platinum group may be coalesced, and thus, it is difficult to stably exhibit the performance. In addition, in this method, the platinum group is adsorbed onto the inside of pores of porous carbon powder to make a three-phase interface which is known as a mechanism of an electrode reaction difficult to be formed, and accordingly, the platinum catalyst is not efficiently acted in the electrode reaction.

In order to decrease a supported amount of the platinum group catalyst, without decreasing an amount of the catalyst used for the electrode reaction, it is important to provide platinum group particles supported on the carbon powder so as to have a uniform size necessary for the electrode reaction, and not to allow the platinum group catalyst to be supported on the inside of the pores of the carbon powder material which does not contribute to the electrode reaction. However, in the configuration of the related art, a size of a complex or a precursor which is a platinum source is small, and therefore the sizes thereof at the time of collection significantly vary. In addition, since the size of the pore of the carbon powder is greater than the size of the complex, the complex may be adsorbed onto the inside of pores of carbon powder, even when the complex is formed, and thus, the following problems are caused. The platinum group catalyst is aggregated to have uneven particle diameters, and the platinum group adsorbed onto the inside of pores of carbon powder is not effectively acted, and thus, activity is low.

SUMMARY

Accordingly, the present disclosure concerns A supported platinum catalyst including platinum group catalyst particles which have a uniform size necessary for an electrode reaction and a platinum group catalyst is not allowed to be supported on the inside of pores of a carbon powder material which does not contribute to the electrode reaction, and a manufacturing method thereof.

According to an aspect, a supported platinum catalyst includes: a carbon powder support; and platinum group particles supported on the carbon powder support, in which the platinum group particles have a particle diameter distribution of 1.0 nm to 6.0 nm.

According to another aspect, a supported platinum catalyst includes: a carbon powder support; and platinum group particles supported on the carbon powder support, in which a percentage of the platinum group particles present in a portion from the surface of the carbon powder support to a depth of 10 nm to the total amount of the platinum group particles supported on the carbon powder support is equal to or greater than 70%.

According to still another aspect, a manufacturing method of a supported platinum catalyst includes: generating a platinum group salt solution using platinum group salts and a complexing agent; mixing the platinum group salt solution and a carbon powder dispersion in which carbon powder is dispersed; and adding a reducing agent to a mixed solution of the platinum group salt solution and the carbon powder dispersion, and reducing the platinum group salts to allow the platinum group particles to be supported on the carbon powder.

According to the supported platinum catalyst, the platinum group particles having a narrow particle diameter distribution of the platinum group particles of 1.0 nm to 6.0 nm and uniform particle diameters are supported.

In addition, according to the supported platinum catalyst, the percentage of the platinum group particles present in a portion from the surface of the carbon powder support to a depth of 10 nm to the total amount of the platinum group particles supported on the carbon powder support is equal to or greater than 70%, and the platinum presence ratio in the vicinity of the surface of the support is increased.

According to a manufacturing method of the supported platinum catalyst, it is possible to prevent penetration of the platinum group complex to the inside of the pores of the carbon powder by steric hindrances of the complexing agent particles and an interaction between the complex and the carbon particles such as an electrostatic interaction, when the platinum group complex formed from the platinum group salt and the complexing agent is adsorbed to the carbon powder. Accordingly, it is possible to increase the presence ratio of the platinum group particles present in a portion of a given depth from the surface of the carbon powder support. In addition, it is possible to set the particle diameters of the platinum group particles to be uniform, that is, to set the particle diameter distribution to be narrow.

DESCRIPTION OF EMBODIMENTS

A supported platinum catalyst according to a first embodiment includes a carbon powder support, and platinum group particles supported on the carbon powder support, and the platinum group particles have a particle size distribution of 1.0 nm to 6.0 nm.

According to a second embodiment, in the supported platinum catalyst according to the first embodiment, an average particle diameter of the platinum group particles may be from 1.5 nm to 3.5 nm.

According to a third embodiment, in the supported platinum catalyst according to the first or second embodiment, a percentage of the platinum group particles present in a portion from the surface of the carbon powder support to a depth of 10 nm to the total amount of the platinum group particles supported on the carbon powder support may be equal to or greater than 70%.

A supported platinum catalyst according to a fourth embodiment includes a carbon powder support, and platinum group particles supported on the carbon powder support, and a percentage of the platinum group particles present in a portion from the surface of the carbon powder support to a depth of 10 nm to the total amount of the platinum group particles supported on the carbon powder support is equal to or greater than 70%.

A manufacturing method of a supported platinum catalyst according to a fifth embodiment includes: generating a platinum group salt solution using platinum group salts and a complexing agent; mixing the platinum group salt solution and a carbon powder dispersion in which carbon powder is dispersed; and adding a reducing agent to a mixed solution of the platinum group salt solution and the carbon powder dispersion, and reducing the platinum group salts to allow the platinum group particles to be supported on the carbon powder.

According to a sixth embodiment, in the manufacturing method of a supported platinum catalyst according to the fifth embodiment, carbon powder and a dispersing agent may be mixed and dispersed in the carbon powder dispersion.

According to a seventh embodiment, in the manufacturing method of a supported platinum catalyst according to the fifth or sixth embodiment, the number of carbon atoms of the complexing agent may be equal to or greater than 6.

Hereinafter, the supported platinum catalyst according to the embodiment and the manufacturing method thereof will be described with reference to the drawings. In the drawings, the same reference numerals are used for the same or corresponding portions and the overlapped description will be omitted. In addition, hereinafter, various exemplary embodiments will be described in detail, but the supported platinum catalyst according to the various embodiments as well as the manufacturing method thereof are not limited to the following descriptions, and various modifications can be performed within a range of a scope thereof.

Fuel Cell

Figure 1:
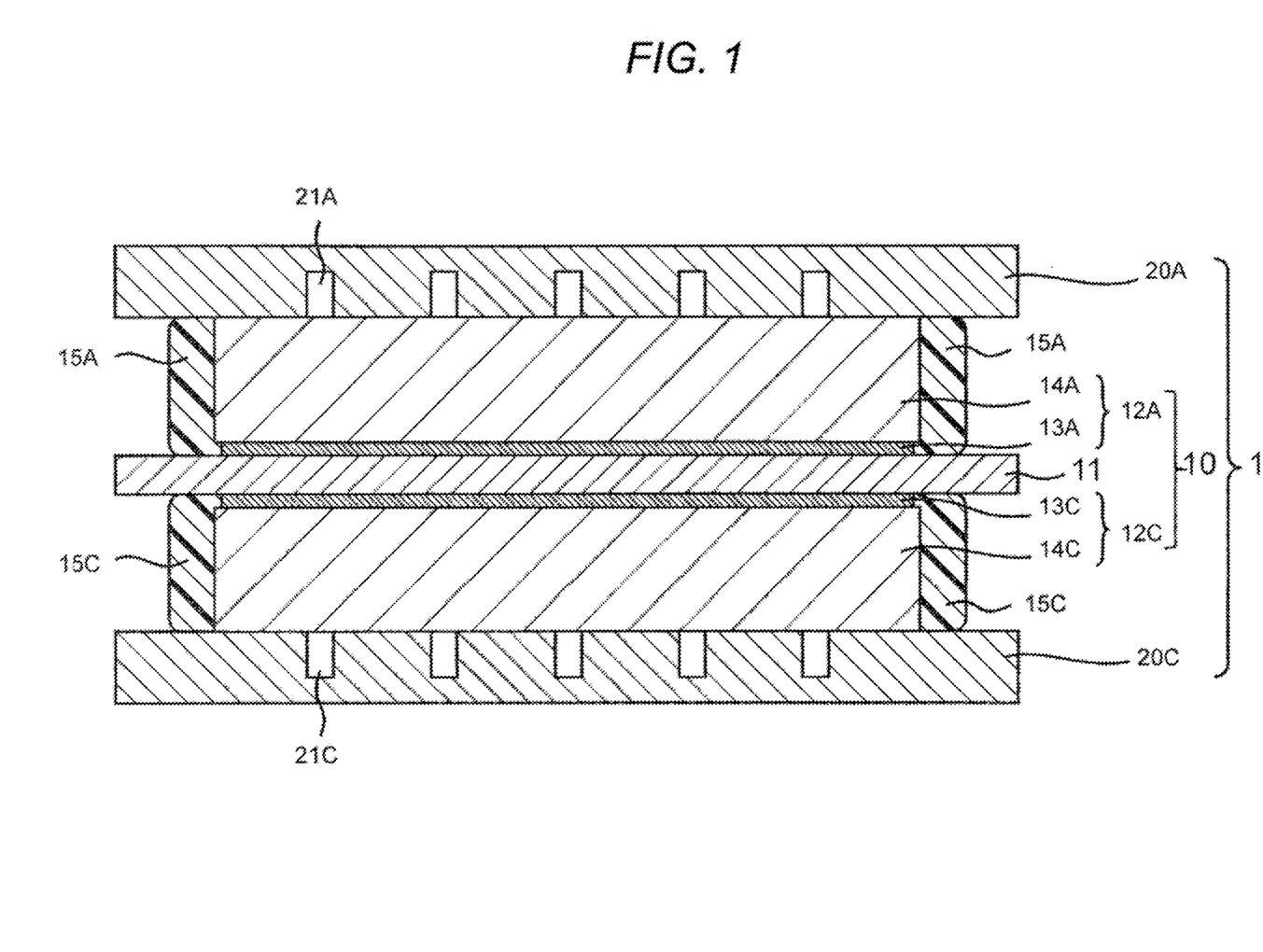
FIG. 1 is a sectional view showing a configuration of a fuel cell according to the embodiment.

FIG. 1 is a sectional view showing a basic configuration of a fuel cell according to the embodiment. The fuel cell according to the embodiment is a polymer electrolyte type fuel cell which generates electric power and heat at the same time by allowing an electrochemical reaction between fuel gas containing hydrogen and oxidant gas containing oxygen such as air. The fuel cell is not limited to the polymer electrolyte type fuel cell and various fuel cells can be applied.

As shown in FIG. 1, the fuel cell according to the embodiment includes cell (single cell) 1 including membrane electrode assembly (MEA) 10 and one pair of plate-shaped conductive separators 20A and 20C which are disposed on both surfaces of membrane electrode assembly (MEA) 10. The fuel cell according to the embodiment may be configured by laminating the plurality of cells 1. In this case, it is preferable that cells 1 laminated on each other are pressurized and fastened with predetermined fastening pressure using a fastening member (not shown) such as a bolt, so that the fuel gas and the oxidant gas are not leaked and contact resistance is decreased.

Membrane electrode assembly (MEA) 10 includes polymer electrolyte membrane 11 which selectively transports hydrogen ions and one pair of electrode layers which are formed on both surfaces of polymer electrolyte membrane 11. One of the pair of electrode layers is an anode (also referred to as a fuel electrode) 12A and the other one is cathode (also referred to as an air electrode) 12C. Anode 12A includes one pair of anode catalyst layers 13A which are formed on one surface of polymer electrolyte membrane 11 and includes carbon powder supporting the platinum group catalyst as a main component, and anode gas diffusion layer 14A which is formed on anode catalyst layer 13A, performs a current collecting operation, and has gas permeability and water repellency. Cathode 12C includes one pair of cathode catalyst layers 13C which are formed on the other surface of polymer electrolyte membrane 11 and includes carbon powder supporting the platinum group catalyst as a main component, and cathode gas diffusion layer 14C which is formed on cathode catalyst layer 13C, performs a current collecting operation, and has gas permeability and water repellency.

In anode separator 20A disposed on anode 12A side, fuel gas flow paths 21A for allowing the fuel gas to flow are provided in the main surface which comes into contact with anode gas diffusion layer 14A. Fuel gas flow paths 21A are, for example, configured with a plurality of grooves approximately parallel to each other. In cathode separator 20C disposed on cathode 12C side, oxidant gas flow paths 21C for allowing the oxidant gas to flow are provided in the main surface which comes into contact with cathode gas diffusion layer 14C. Oxidant gas flow paths 21C are, for example, configured with a plurality of grooves approximately parallel to each other. In addition, coolant path flows (not shown) through which coolant or the like passes may be provided in anode separator 20A and cathode separator 20C. The fuel gas is supplied to anode 12A through fuel gas flow paths 21A and the oxidant gas is supplied to cathode 12C through oxidant gas flow paths 21C, and accordingly, an electrochemical reaction occurs and electric power and heat are generated.

In the above-mentioned description, fuel gas flow paths 21A are provided in anode separator 20A, but the fuel cell is not limited thereto. For example, fuel gas flow paths 21A may be provided in anode gas diffusion layer 14A. In this case, anode separator 20A may have a flat plate shape. In the same manner, in the above-mentioned description, oxidant gas flow paths 21C are provided in cathode separator 20C, but the fuel cell is not limited thereto. For example, oxidant gas flow paths 21C may be provided in cathode gas diffusion layer 14C. In this case, cathode separator 20C may have a flat plate shape.

Anode gaskets 15A, as sealing materials, are disposed between anode separator 20A and polymer electrolyte membrane 11 so as to cover side surfaces of anode catalyst layer 13A and anode gas diffusion layer 14A, in order to prevent leakage of the fuel gas to the outside. In addition, cathode gaskets 15C, as sealing materials, are disposed between cathode separator 20C and polymer electrolyte membrane 11 so as to cover side surfaces of cathode catalyst layer 13C and cathode gas diffusion layer 14C, in order to prevent leakage of the oxidant gas to the outside.

In general, a thermoplastic resin or a thermosetting resin can be used as anode gasket 15A and cathode gasket 15C. For example, a silicon resin, an epoxy resin, a melamine resin, a polyurethane resin, a polyimide resin, an acrylic resin, an ABS resin, a polypropylene resin, a liquid crystal polymer, a polyphenylene sulfide resin, polysulfone, or a glass-fiber reinforced resin can be used as anode gasket 15A and cathode gasket 15C.

It is preferable that some parts of anode gasket 15A and cathode gasket 15C are penetrated into peripheral edges of anode gas diffusion layer 14A or cathode gas diffusion layer 14C. Accordingly, it is possible to improve power generation durability and strength.

Instead of anode gasket 15A and cathode gasket 15C, the gasket may be disposed between anode separator 20A and cathode separator 20C so as to cover the side surfaces of polymer electrolyte membrane 11, anode catalyst layer 13A, anode gas diffusion layer 14A, cathode catalyst layer 13C, and cathode gas diffusion layer 14C. Accordingly, it is possible to prevent deterioration of polymer electrolyte membrane 11 and to improve handling ability of MEA 10 and workability during mass production.

Next, the supported platinum catalyst according to the embodiment and the manufacturing method thereof will be more specifically described.

Supported Platinum Catalyst

The supported platinum catalyst according to the embodiment includes a carbon powder support, and platinum group particles supported on the carbon powder support. The particle size distribution ($D_{90}$) of the platinum group particles is from 1.0 nm to 6.0 nm. The particle size distribution ($D_{90}$) means 90% of the entirety of platinum group particles. That is, the particle size distribution ($D_{90}$) means that 90% of the entirety of platinum group particles is contained in a range of 1.0 nm to 6.0 nm. In a case of showing standard deviation, a particle diameter may be smaller than 0.8, for example, as a variation of the particle diameter distribution of the platinum group particles. The average particle diameter of the platinum group particles is preferably from 1.5 nm to 3.5 nm.

Alternatively, in the supported platinum catalyst according to the embodiment, a percentage of the platinum group particles present in a portion from the surface of the carbon powder support to a depth of 10 nm to the total amount of the platinum group particles supported on the carbon powder support is equal to or greater than 70%. The carbon powder support indicates carbon particles configuring carbon powder.

1. Manufacturing Method of Supported Platinum Catalyst

Figure 2:
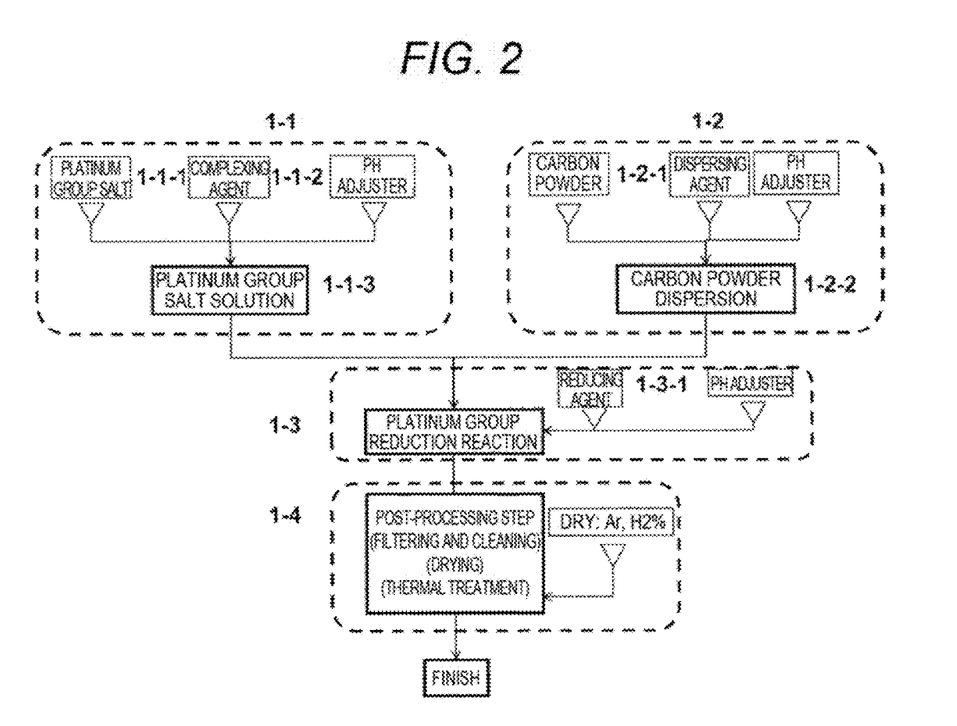
FIG. 2 is a schematic view showing a method of manufacturing a supported platinum catalyst according to the embodiment.

In the supported platinum catalyst and the manufacturing method thereof according to the various exemplary embodiments (hereinafter, suitably referred to as "the supported platinum catalyst and the manufacturing method thereof"), the manufacturing method includes a step of mixing a solution containing a complexing agent in platinum group salts and a mixed solution in which carbon powder is dispersed with each other and causing contact with a reducing agent. The complexing agent is an organic compound containing sulfur atoms and/or nitrogen atoms. FIG. 2 shows a schematic view of the steps of the manufacturing method.

The supported platinum catalyst is not limited to the solid polymer fuel cell and can be applied to various catalysts by controlling a reduction rate of the metal salts by controlling the types of the metal salts, the complexing agent, and the reducing agent, and a value of pH at the time of reduction reaction, and to synthesize a homogeneous nano-metal compound.

1-1. Platinum Group Salt Solution Step 1-1-1. Platinum Group Salts

Examples of the platinum group salts used in the manufacturing method include an inorganic compound (an oxide of the platinum group, nitrate, or sulfate), a halide (a chloride of the platinum group or the like), organic salt (an acetate of the platinum group or the like), complex salts (an amine complex of the platinum group or the like), and an organic metal compound (an acetylacetonato complex of the platinum group or the like). In addition, the platinum group metal may be dissolved in a reaction solution as it is and used. As well known, the platinum group contains each element such as Ru, Rh, Pd, Os, and Ir, in addition to Pt.

Among these, as the platinum group salts, an inorganic compound containing the platinum group, a halide of the platinum group, or an organic metal compound containing the platinum group is preferably used and specifically, a chloride of the platinum group is particularly preferably used.

The platinum group salts may be used alone as any one kind or may be used in arbitrary combination and ratio of two or more kinds thereof.

1-1-2. Complexing Agent

In the manufacturing method of the supported platinum catalyst, a complexing agent is an extremely important factor.

In the manufacturing method of the supported platinum catalyst, an organic compound containing sulfur atoms and/or nitrogen atoms for easily forming a complex is used as the complexing agent.

Examples of the complexing agent containing sulfur atoms or nitrogen atoms include organic acids, a phosphorus compound, oximes, amides, amines, and alcohols.

Specific examples of the complexing agent include the following compounds. Examples thereof include D-2-Amino-3-mercapto-3-methylbutanoic acid (penicillamine: molecular formula $C_6H_{11}O_2NS$), Iminodiacetic acid (abbreviated as IDA: $C_4H_7O_4N$), N-(Cyclohexyl)iminodiacetic acid (molecular formula $C_{10}H_{17}O_4N$), N-(2-Tetrahydro pyranylmethyl)iminodiacetic acid (molecular formula $C_{10}H_{17}O_5N$), N-(2-Hydroxyethyl)ethylenedinitrilo-N,N',N'-triacetic acid (abbreviated as HEDTA: molecular formula $C_{10}H_{18}O_7N_2$), Ethylenedinitrilotetraacetic acid (abbreviated as EDTA: molecular formula $C_{10}H_{16}O_8N_2$), DL-(Methylethylene)dinitrilotetraacetic acid (abbreviated as PDTA: molecular formula $C_{11}H_{18}O_8N_2$), trans-1,2-Cyclohexylene dinitrilotetraacetic acid (abbreviated as CDTA: molecular formula $C_{14}H_{22}O_8N_2$), Ethylenebis (oxyethylenenitrilo) tetraacetic acid (abbreviated as EGTA: molecular formula $C_{14}H_{24}O_{10}N_2$), Diethylenetrinitrilotetraacetic acid (abbreviated as DTPA: molecular formula $C_{14}H_{23}O_{10}N_3$), Triethylenetetranitrilohexaacetic acid (abbreviated as TTHA: molecular formula $C_{18}H_{30}O_{12}N_4$), 6-Methlpyridine-2-carboxylic acid (molecular formula $C_7H_7O_2N$), N-(2-Pyridylmethyl)iminodiacetic acid (molecular formula $C_{10}H_{12}O_4N_2$), (Substituted thio)acetic acid represented by formula Z—SCH$_2$CO$_2$H (in the formula, Z represents an alkyl group having 1 to 30 carbon atoms such as a methyl group, an ethyl group, a propyl group, a butyl group, a 1-methylpropyl group, a pentyl group, or a hexyl group; an alkenyl group having 2 to 30 carbon atoms such as 2-propenyl (prop-2-enyl) group, 3-butenyl (but-3-enyl) group, or 4-pentenyl (pent-4-enyl) group; an aryl group having 6 to 30 carbon atoms such as a benzyl group), hexadecyltrimethylammonium bromide (abbreviated as CTAB: molecular formula $C_{19}H_{42}BrN$), DL-mercaptobutanedioic acid (thiomalic acid: molecular formula $C_4H_6O_4S$), (ethylenedithio)diacetic acid (molecular formula $C_6H_{10}O_4S_2$), oxybis(ethylenethioacetic acid) (molecular formula $C_8H_{14}O_5S_2$), thiobis (ethylenethioacetic acid) (molecular formula $C_8H_{14}O_4S_3$), carboxymethylthiobutanedioic acid (molecular formula $C_6H_8O_6S$), 2,2-bis (hydroxy methyl)-3-mercaptopropanol (monothio pentaerythtitol: molecular formula $C_5H_{12}O_3S$), thiosalicylic acid (abbreviated as TS: molecular formula $C_7H_6O_2S$), hexadecyltrimethylammonium bromide: molecular formula $C_{13}H_{42}BrN$, and diethanolamine (abbreviated as DEA: molecular formula: $(HOCH_2CH_2)_2NH$).

In addition, it is considered that an effect of reduction of the aggregation between the complexes and a possibility of preventing penetration of the carbon support into the pores are increased, as the size of the complex in which the complexing agent is coordinated to the platinum group salt increases, and therefore, the large number of carbon atoms of the complexing agent is desired. Two or three complexing agents may be coordinated to the metal salt, there is no limitation, and the number of carbon atoms of the complexing agent is preferably equal to or greater than 6.

Among these, more preferable examples of the complexing agent include Ethylenedinitrilotetraacetic acid (abbreviated as EDTA: composition formula $C_{10}H_{16}O_8N_2$), hexadecyltrimethylammonium bromide (abbreviated as CTAB: molecular formula $C_{19}H_{42}BrN$), and Diethanolamine (abbreviated as DEA: molecular formula $(HOCH_2CH_2)_2NH$).

The various exemplified complexing agents may be used alone as any one kind or may be used in arbitrary combination at an arbitrary ratio of two or more kinds thereof.

1-1-3. Platinum Group Salt Solution

In the manufacturing method, a solution obtained by dissolving the platinum group salt and the complexing agent in a solvent (hereinafter, referred to as a "platinum group salt solution") is used.

The type of the solvent is not limited as long as the problems discussed herein are solved and effects are exhibited, and water or an organic solvent is generally used. Examples of the organic solvent include alcohols such as methanol or ethanol.

Among these, as the solvent, water is preferable and distilled water is particularly preferably used from a viewpoint of ease of control of pH.

The solvent may be used alone as any one kind or may be used in arbitrary combination at an arbitrary ratio of two or more kinds thereof.

It is preferable that the platinum group salt solution is adjusted to be alkaline. Specifically, the pH of a reaction solution is generally equal to or greater than 7, preferably equal to or greater than 8, and more preferably equal to or greater than 9. It is possible to stably form the complex by setting the pH to be equal to or greater than 9. When the pH of the reaction solution is excessively low, that is alkalinity thereof is excessively low, the platinum group complex may not be formed. In addition, in a case where the pH thereof is excessively high, for example, in a case where the pH thereof exceeds 13, the reduction rate becomes fast and the platinum group particles may greatly grow. In order to allow the platinum group particles having even particle diameter to be supported on the support, the range of the pH is important and the pH thereof is preferably equal to or smaller than 13.

A method of adjusting the pH of the platinum group salt solution is not limited and a pH adjuster is generally used. The type of the pH adjuster is not limited as long as the pH adjuster is not coordinated to the platinum group in the platinum group salt or is a compound having a low degree of coordination so as not to disturb the complex formation of the platinum group by the complexing agent.

Examples of the pH adjuster include hydrochloric acid, nitric acid, sulfuric acid, ammonia, potassium hydroxide, and sodium hydroxide. Among these, hydrochloric acid, nitric acid, and sodium hydroxide are preferable.

The pH adjuster may be used alone as any one kind or may be used in arbitrary combination at an arbitrary ratio of two or more kinds thereof.

The platinum group salt solution is obtained by mixing the platinum group salt, the complexing agent, and the pH adjuster with the solvent described above to cause complexation the platinum group salt, and dissolving the platinum group in a solvent in a metal complex state.

In the manufacturing method, it is important to completely dissolve the platinum group salt and the complexing agent in the platinum group solution and spend sufficient time for obtaining a homogeneous solution without precipitation.

If the points described above are achieved, a method of dissolving and mixing the platinum group salt, the complexing agent, or the pH adjuster is not particularly limited. Each of the platinum group salt, the complexing agent, and the pH adjuster may be dissolved in a solvent and then mixed with each other, or the platinum group salt and the complexing agent or the pH adjuster may be mixed in advance and then dissolved in the solvent.

However, in order to prevent the precipitation of the platinum group salt solution, it is desired to suitably select concentration of the platinum group salt and the complexing agent with respect to the solvent or the temperature or the pH thereof at the time of mixing and dissolving. That is, the concentration of the platinum group salt, the complexing agent, and the pH adjuster in the platinum group salt solution is respectively set as concentration which is equal to or lower than saturation solubility of the platinum group salt and the complexing agent. The saturation solubility varies depending on the type of the platinum group salt and the complexing agent, the type of solvent, the temperature at the time of dissolving, and the like, and thus, the concentration of the platinum group salt and the complexing agent may be selected according thereto.

In general, the concentration of all of the platinum group salts with respect to the platinum group salt solution is typically equal to or greater than 0.001% by weight, preferably equal to or greater than 0.005% by weight, and more preferably equal to or greater than 0.01% by weight, or is typically equal to or smaller than 10% by weight, preferably equal to or smaller than 5% by weight, and more preferably equal to or smaller than 2% by weight, in terms of weight of the platinum group.

A ratio of the content of the metal atoms of the platinum group salt is set as each ratio of the platinum group atoms used which substantially coincides with that in the desired composition of the supported platinum catalyst.

The ratio of the amount of the complexing agents used with respect to the platinum group atoms contained in the platinum group salt may be equal to or greater than a theoretical mixture ratio thereof coordinated to the platinum group, but when the ratio of the complexing agent is excessively high, the concentration of the platinum group is decreased in a relationship of solubility as a result, an amount of the platinum group which can be supported in one operation may be decreased, and this is not preferable economically. In general, the ratio thereof is equal to or greater than 1.0 times the theoretical mixture ratio and equal to or smaller than 10 times the theoretical mixture ratio, preferably equal to or smaller than 5 times the theoretical mixture ratio, more preferably equal to or smaller than 2 times the theoretical mixture ratio, and particularly preferably equal to or smaller than 1.5 times the theoretical mixture ratio.

The platinum group salt solution may contain components other than the platinum group salt, the complexing agent, and the solvent, within a range not disturbing a reduction reaction which will be described later. Examples of the other components include metal salts containing metal atoms other than the platinum group. These may be used alone as any one kind or may be used in arbitrary combination at an arbitrary ratio of two or more kinds thereof.

1-2. Carbon Powder Dispersion Solution Step 1-2-1. Carbon Powder

In the manufacturing method, a solution obtained by dispersing carbon powder in a solvent (hereinafter, referred to as a "carbon powder dispersion") is mixed with the platinum group salt solution described above to cause a platinum group reduction reaction.

As the carbon powder used, carbon powder having a specific surface area of 250 $m^2/g$ to 1200 $m^2/g$ is desirably used. By setting the specific surface area thereof to be equal to or greater than 250 $m^2/g$, the area to be attached by the catalyst can be increased, and therefore, it is possible to disperse the catalyst particles in a high state and an increase effective surface area. Meanwhile, when the specific surface area exceeds 1200 $m^2/g$, a presence percentage of ultramicroscopic pores (approximately less than 20 Å) through which ion-exchanger resins hardly penetrate when forming the electrode is increased and usage efficiency of the catalyst particles is decreased. Examples of the carbon powder include carbon black, acetylene black, Ketjen black, and carbon nanotube. These may be used alone as any one kind or may be used in arbitrary combination at an arbitrary ratio of two or more kinds thereof.

The type of the solvent is not limited as long as the problems described herein are solved and effects are exhibited, and water or an organic solvent is generally used. Examples of the organic solvent include alcohols such as methanol or ethanol.

Among these, as the solvent, water is preferable and distilled water is particularly preferably used from a viewpoint of ease of control of pH.

The solvent may be used alone as any one kind or may be used in arbitrary combination at an arbitrary ratio of two or more kinds thereof.

1-2-2. Carbon Powder Dispersion

The carbon powder and the solvent are generally mixed by stirring or using a mixing device to obtain a carbon powder dispersion. At that time, a dispersing agent may be added in order to improve affinity of the carbon powder with the solvent.

As the dispersing agent, a general dispersing agent can be used, but it is necessary that the platinum group complex is not aggregated when performing the mixing with the platinum group salt solution described above in the platinum group reduction reaction which is a later step.

Since the pH of the platinum group salt solution is adjusted to be alkaline by the pH adjuster, it is preferable that the carbon powder dispersion is also adjusted to be alkaline, in the same manner. Specifically, the pH of the reaction solution is generally equal to or greater than 7, preferably equal to or greater than 8, and more preferably equal to or greater than 9. When the pH of the reaction solution is excessively low (that is, alkalinity thereof is excessively low), the complex may not be formed in the mixing process with the platinum group salt solution in the later stage.

A method of adjusting the pH is not limited and a pH adjuster is generally used. Examples of the pH adjuster include hydrochloric acid, nitric acid, sulfuric acid, ammonia, potassium hydroxide, and sodium hydroxide. Among these, hydrochloric acid, nitric acid, and sodium hydroxide are preferable. The pH adjuster may be used alone as any one kind or may be used in arbitrary combination at an arbitrary ratio of two or more kinds thereof.

1-3. Platinum Group Reduction Reaction Step

In the manufacturing method of the supported platinum catalyst according to the embodiment, the supported platinum catalyst in which the platinum group particles are adsorbed onto the surface of the carbon powder is obtained by mixing the platinum group salt solution described above and the carbon powder dispersion described above in advance, and causing a contact with a reducing agent to allow a reduction reaction of the platinum group.

1-3-1. Reducing Agent

The type of the reducing agent used in the manufacturing method is not limited, as long as the reducing agent is soluble in a solvent of the platinum group salt solution and/or the carbon powder dispersion.

Specific examples of the reducing agent include a nitrogen compound such as hydrazine, a boron compound such as sodium borohydride, aldehydes such as formaldehyde, L-ascorbic acid, and similar carboxylic acids, and alcohols such as methanol.

Among these, hydrazine and L-ascorbic acid are preferable as the reducing agent.

The exemplified reducing agents may be used alone as any one kind or may be used in arbitrary combination at an arbitrary ratio of two or more kinds thereof.

The amount of the reducing agent used is preferably an amount so that all of the platinum group complexes contained in the platinum group salt solution described above can be sufficiently reduced to the platinum group.

In general, the amount thereof may be equal to or greater than 1 time equivalent to 1 equivalent of metal, and when considering efficiency of the reduction reaction, the amount thereof is preferably equal to or greater than 1.2 times equivalent, more preferably equal to or greater than 1.5 times equivalent, and even more preferably equal to or greater than 2 times equivalent to 1 equivalent of metal. In addition, when considering the post-process of unreacted materials, the upper limit thereof is generally equal to or smaller than 500 times equivalent, preferably equal to or smaller than 100 times equivalent, and more preferably equal to or smaller than 40 times equivalent thereto.

In a case of using hydrazine as the reducing agent, it is known that the state of the reduction reaction occurring due to hydrazine changes depending on the conditions such as the type of the metal salt reduced or the pH, and accordingly, reduction equivalent of hydrazine may not be uniformly specified. Thus, the reduction equivalent is set as 2 equivalent per one mol of hydrazine.

A method of bringing the platinum group salt solution, the carbon powder dispersion, and the reducing agent to come into contact with each other is not limited. Generally, the reducing agent may be added and mixed with the mixed solution obtained by mixing the platinum group salt solution described above and the carbon powder dispersion described above to cause the reduction reaction of the platinum group.

The reducing agent may be directly added and mixed with the platinum group salt solution, but in order to easily perform the mixing and dissolving in the platinum group salt solution, the reducing agent may be dissolved in a solvent in advance and this solution (hereinafter, referred to as a "reducing agent solution") may be added and mixed with the platinum group salt solution.

In this case, the type of the solvent is not limited, as long as the solvent can dissolve the reducing agent. The solvent may be used alone as any one kind or may be used in arbitrary combination and ratio of two or more kinds thereof. However, the same solvent as the solvent of the platinum group salt solution is generally used. The concentration of the reducing agent in the reducing agent solution or the amount of the reducing agent solution used is not particularly limited. In a case where the reducing agent solution is added to the platinum group salt solution, the amount of the reducing agent with respect to the metal in the platinum group salt solution may be suitably adjusted so as to satisfy the range described above.

The temperature at the time of the reduction reaction is generally equal to or higher than 4° C., preferably equal to or higher than 10° C., and generally equal to or lower than a boiling point, preferably equal to or lower than 95° C., and more preferably equal to or lower than 90° C. When the temperature at the time of the reduction reaction is excessively high, the reduction reaction rapidly proceeds, and accordingly, compounds other than the desired platinum group compound may be generated. Meanwhile, when the temperature is excessively low, a reducing power is excessively weak, and accordingly, the desired platinum group compound may not be obtained. In the following description, the temperature range regulated is referred to as a "regulated temperature range".

As a procedure of starting the reducing reaction, two methods a) and b) below are used and any one may be used.

a) A method of adding and mixing a reducing agent (reducing agent solution) with a mixed solution of a platinum group salt solution and a carbon powder dispersion at a temperature which is low so as not to allow a reduction reaction to proceed even when the reducing agent is added (temperature which is lower than the regulated reducing temperature range. The temperature is generally equal to or lower than room temperature, preferably equal to or lower than 10° C., and more preferably equal to or lower than 5° C.), and increasing the temperature to a temperature (temperature in the regulated temperature range) which is sufficient to allow the reduction reaction to proceed.

b) A method of previously heating a mixed solution of a platinum group salt solution and a carbon powder dispersion to a temperature (temperature in the regulated temperature range) which is sufficient to allow a reduction reaction of the platinum group salt to proceed, and adding a reducing agent in that state to start the reduction reaction.

It is preferable to adjust the reaction solution (solution obtained by adding the reducing agent to the platinum group salt solution and the carbon powder dispersion) to be alkaline, at the time of the reduction reaction. Specifically, the pH of the reaction solution is generally equal to or greater than 7, preferably equal to or greater than 8, and more preferably equal to or greater than 9. It is possible to stably form the complex by setting the pH to be equal to or greater than 9. When the pH of the reaction solution is excessively low (that is, alkalinity thereof is excessively low), the platinum group complex may not be formed. In addition, in a case where the pH thereof is excessively high, for example, in a case where the pH thereof exceeds 13, the reduction rate becomes fast and the platinum group particles may greatly grow. In order to allow the platinum group particles having even particle diameter to be supported on the support, the range of the pH is important and the pH thereof is preferably equal to or smaller than 13.

A method of adjusting the pH of the reaction solution is not limited and a pH adjuster is generally used.

The type of the pH adjuster is not limited as long as the pH adjuster is not coordinated to the platinum group in the platinum group salt or is a compound having a low degree of coordination so as not to disturb the complex formation of the platinum group by the complexing agent.

Examples of the pH adjuster include hydrochloric acid, nitric acid, sulfuric acid, ammonia, potassium hydroxide, and sodium hydroxide. Among these, hydrochloric acid, nitric acid, and sodium hydroxide are preferable.

The pH adjuster may be used alone as any one kind or may be used in arbitrary combination at an arbitrary ratio of two or more kinds thereof.

A method of adjusting the pH using the pH adjuster is not limited. Before proceeding the reduction reaction, the pH of the reaction solution may be adjusted in the regulated range while maintaining the state where the platinum group salt is not precipitated.

The adjustment of the pH using the pH adjuster may be performed once or may be performed two or more times.

1-4. Post-Processing Step

In the embodiment, a post-processing step such as filtering and cleaning, drying, if necessary, thermal treatment for separating the supported platinum catalyst obtained by the reduction reaction described above is added.

A method of separating the obtained supported platinum catalyst from the reaction solution is not limited, and a filtering method using filter paper or a filter cloth, centrifugal separation, precipitation separation (decantation), and the like are used. Among these, a filtering method is generally used. The methods may be used alone as any one kind and may be used in arbitrary combination of two or more kinds thereof.

In a case of cleaning the separated supported platinum catalyst, a solvent used for cleaning (cleaning solvent) is not limited as long as the solvent does not cause a reaction with the supported platinum catalyst or does not cause undesirable effects to the purpose of the supported platinum catalyst (purpose of catalyst), and the same solvent as the solvent used in the metal salt solution described above is generally used. The cleaning solution may be used alone as any one kind or may be used in arbitrary combination and ratio.

In a case of drying the supported platinum catalyst after separation (or cleaning), pressure at the time of drying is not limited, and ordinary pressure, reduced pressure (or vacuum), or increased pressure may be used. In general, the drying is performed under the condition of approximately ordinary pressure (ordinary pressure or slightly reduced or increased pressure).

Examples of the drying method include still-standing drying using an oven or the like, rotary drying using a kiln or a rotary evaporator, fixed bed flash drying, fluid bed drying, spray drying using a spray drier or the like, transfer type drying using a belt furnace or the like, and freeze-drying, and any one may be used.

The selection of the drying method is determined according to the processing amount, and it is desirable to perform the drying while allowing gas to flow through, in any drying method.

The gas allowed to flow through at the time of drying is not limited, and generally air or nitrogen is used, from an economical viewpoint. In a case of performing hydrogen treatment of the supported platinum catalyst, hydrogen may be added to the gas allowed to flow through at the time of drying.

Meanwhile, in a case of using the supported platinum catalyst for the desired purpose, without performing the hydrogen treatment after the drying, inert gas is preferable and nitrogen is preferable from an economical viewpoint. The gas may be used alone as any one kind or may be used in arbitrary combination and ratio of two or more kinds thereof. From a viewpoint of performing the drying rapidly, it is also preferable to perform the drying under the flow of superheated steam.

The temperature at the time of drying is not particularly limited. Any of freeze-drying of performing the drying at a temperature which is equal to or lower than a melting point of the remaining solvent or cleaning solvent, low-temperature dry or room-temperature dry of performing the drying at a temperature which is from a melting point of the remaining solvent or cleaning solvent to room temperature, and heating dry of increasing vapor pressure of the remaining solvent or cleaning solvent at a temperature higher than room temperature may be used, and the heating dry is generally used. In a case of the heating dry, the drying temperature is generally equal to or higher than 40° C. and equal to or lower than 300° C. In a case where the gas allowed to flow through is other than the superheated steam, the treatment is performed at a temperature equal to or lower than the boiling point of the remaining solvent or cleaning solvent, in order to prevent rapid bumping.

In a case of performing thermal treatment with respect to the dried supported platinum catalyst, examples of the thermal treatment include a still-standing type using an oven or the like, a rotary type using a kiln or a rotary evaporator, a fixed bed type, a fluid bed type, or a transfer type using a belt furnace or the like, and any one may be used.

The selection of the drying method is determined according to the processing amount, and it is desirable to perform the drying while allowing gas to flow through, in any drying method.

The gas allowed to flow through is preferably gas not containing oxygen. Specifically, inert gas such as nitrogen, argon, or helium, or hydrogen is used. The gas may be used alone as any one kind or may be used in arbitrary combination and ratio of two or more kinds thereof. Among these, argon, nitrogen, or hydrogen is preferably used alone or as a mixture.

The lower limit of the temperature of the thermal treatment is generally equal to or higher than 100° C., preferably equal to or higher than 150° C. and more preferably equal to or higher than 200° C.

The lower limit of the temperature of the thermal treatment may be generally equal to or lower than the melting point of the platinum group, but when the lower limit thereof is excessively high, the size of the platinum group increases due to sintering, and the metal surface area is decreased, to cause a decrease in catalyst activity in a case where the obtained supported platinum catalyst is used. Therefore, in order to improve the activity of the catalyst, the upper limit of the temperature of the thermal treatment is generally equal to or lower than 400° C., preferably equal to or lower than 350° C., and more preferably equal to or lower than 300° C.

Embodiment 1

A more specific manufacturing method of the platinum-supported carbon powder of Embodiment 1 will be described below with reference to FIG. 2.

By using hexachloroplatinate as the platinum salt, EDTA as the complexing agent, and sodium hydroxide as the pH adjuster, first, the platinum salt and the complexing agent were dissolved and dispersed in an aqueous ethanol solution having 20 wt % of a solvent composition, a platinum salt solution having pH of 10 was prepared by adjusting the pH by using the pH adjuster, and then, the solution was stirred at 30° C. for 24 hours (Step 1-1).

Next, by using Ketjen black EC (manufactured by Lion Corporation) as the carbon powder, sodium hydroxide as the pH adjuster, and hexadecyltrimethylammonium bromide (CTAB) as the dispersing agent, the carbon powder and the dispersing agent were dissolved and dispersed in an aqueous ethanol solution having 20 wt % of a solvent composition, a carbon powder dispersion was prepared by adjusting the pH by using the pH adjuster (Step 1-2).

The platinum salt solution and the carbon powder dispersion were mixed with each other and stirred for a predetermined time by setting the pH to 10 using sodium hydroxide as the pH adjuster, and a platinum group salt-carbon powder mixed solution was obtained.

In addition, L-ascorbic acid and hydrazine as the reducing agent were dissolved in 20 wt % aqueous ethanol solution in advance, and the pH was adjusted to 10 by adding sodium hydroxide as the pH adjuster, to prepare a reducing agent solution. Then, the reducing agent solution in which the amount of the reducing agent corresponds to 1.5 times equivalent with respect to the platinum equivalent in the platinum salt solution was mixed with the platinum group salt-carbon powder mixed solution, stirred and left at 30° C. for 1 hour, and a mixed solution of the supported platinum catalyst in which the platinum is adsorbed to the surface of the carbon powder was obtained (Step 1-3).

Next, as the post-processing step, the carbon powder on which the platinum is supported was separated by performing filtering by the mixed solution, and dried under the nitrogen gas stream at 90° C. for 1 hour, and thermal treatment was performed at 150° C. for 1 hour by 5% hydrogen gas under the argon atmosphere as the thermal treatment, to obtain platinum-supported carbon powder (Step 1-4).

Embodiment 2

Platinum-supported carbon powder was obtained in the same manner as in Embodiment 1, except for setting the complexing agent of the platinum group salt solution as DEA.

Embodiment 3

Platinum-supported carbon powder was obtained in the same manner as in Embodiment 1, except for setting the complexing agent of the platinum group salt solution as CTAB.

Embodiment 4

Platinum-supported carbon powder was obtained in the same manner as in Embodiment 3, except for setting the platinum salt as platinum tetrachloride acid.

Embodiment 5

Platinum-supported carbon powder was obtained in the same manner as in Embodiment 3, except for setting the carbon powder of the carbon powder dispersion as acetylene black (DENKA BLACK manufactured by Denki Kagaku Kogyo Kabushiki Kaisha).

Embodiment 6

Platinum-supported carbon powder was obtained in the same manner as in Embodiment 3, except for setting the carbon powder of the carbon powder dispersion as VULCAN XC72 (manufactured by Cabot Corporation).

Embodiment 7

Platinum-supported carbon powder was obtained in the same manner as in Embodiment 3, except for setting the additive amount of the reducing agent in the platinum group reduction reaction step as 1.2 times equivalent.

Embodiment 8

Platinum-supported carbon powder was obtained in the same manner as in Embodiment 3, except for setting the additive amount of the reducing agent in the platinum group reduction reaction step as 3.0 times equivalent.

Embodiment 9

Platinum-supported carbon powder was obtained in the same manner as in Embodiment 3, except for setting the thermal treatment temperature in the post-processing step as 200° C.

Embodiment 10

Platinum-supported carbon powder was obtained in the same manner as in Embodiment 3, except for setting the thermal treatment temperature in the post-processing step as 280° C.

Embodiment 11

Platinum-supported carbon powder was obtained in the same manner as in Embodiment 9, except for directly putting the carbon powder into the platinum group complex solution, without preparing the solution obtained by dispersing the carbon powder in a solvent, by omitting the carbon powder dispersion step.

Results of various evaluations regarding the platinum-supported carbon powder obtained in Embodiments 1 to 11 and commercially available platinum-supported carbon powder as Comparative Example 1 are shown below. Table 1 shows results of the evaluations as a list.

TABLE 1

|  |  |  | Embodiment 1 | Embodiment 2 | Embodiment 3 | Embodiment 4 | Embodiment 5 | Embodiment 6 |
|---|---|---|---|---|---|---|---|---|
| Step 1-1 | Material 1-1-1 | Platinum type | Hexa-chloroplatinate | Hexa-chloroplatinate | Hexa-chloroplatinate | Tetrachloride acid | Hexa-chloroplatinate | Hexa-chloroplatinate |
|  | Material 1-1-2 | Complexing agent | EDTA | DEA | CTAB | CTAB | CTAB | CTAB |
| Step 1-2 | Material 1-2-1 | Carbon power | Ketjen black EC | Ketjen black EC | Ketjen black EC | Ketjen black EC | Acetylene black | VULCAN XC72 |
| Step 1-3 | Material 1-3-1 | Reducing agent | ascorbic acid hydrazine | ascorbic acid hydrazine | ascorbic acid hydrazine | ascorbic acid hydrazine | ascorbic acid hydrazine | ascorbic acid hydrazine |

TABLE 1-continued

|  |  |  | | | | | | |
|---|---|---|---|---|---|---|---|---|
|  | Additive amount | Reducing agent | 1.5 times | 1.5 times | 1.5 times | 1.5 times | 1.5 times | 1.5 times |
| Step 1-4 | Thermal treatment conditions | Temperature time condition | 150° C. 1 hour | 150° C. 1 hour | 150° C. 1 hour | 150° C. 1 hour | 150° C. 1 hour | 150° C. 1 hour |
| Results of evaluation | X-ray diffraction | Presence of platinum | ○ | ○ | ○ | ○ | ○ | ○ |
|  | SEM image particle size distribution | Average particle diameter [nm] | 2.42 | 2.21 | 2.61 | 2.32 | 2.48 | 2.31 |
|  |  | Variation | 0.53 | 0.48 | 0.53 | 0.42 | 0.68 | 0.51 |
|  |  | Maximum particle diameter [nm] | 4.13 | 4.87 | 4.99 | 3.70 | 4.42 | 3.63 |
|  | Surface image/ transmission image | Surface platinum particle number/total platinum particle number [%] | 36.6 | 35.6 | 37.1 | 35.0 | 35.9 | 34.3 |
|  | 3DTEM | Percentage of platinum present in vicinity of surface of support [%] | 80< | 70< | 90< | 90< | 90< | 90< |

|  |  |  | Embodiment 7 | Embodiment 8 | Embodiment 9 | Embodiment 10 | Embodiment 11 | Com. Ex. 1 |
|---|---|---|---|---|---|---|---|---|
| Step 1-1 | Material 1-1-1 | Platinum type | Hexa- chloroplatinate | Hexa- chloroplatinate | Hexa- chloroplatinate | Hexa- chloroplatinate | Hexa- chloroplatinate |  |
|  | Material 1-1-2 | Complexing agent | CTAB | CTAB | CTAB | CTAB | CTAB |  |
| Step 1-2 | Material 1-2-1 | Carbon power | Ketjen black EC | Ketjen black EC | Ketjen black EC | Ketjen black EC |  |  |
| Step 1-3 | Material 1-3-1 | Reducing agent | ascorbic acid hydrazine | ascorbic acid hydrazine | ascorbic acid hydrazine | ascorbic acid hydrazine | Ketjen black EC ascorbic acid hydrazine |  |
|  | Additive amount | Reducing agent | 1.2 times | 3.0 times | 1.5 times | 1.5 times | 1.5 times |  |
| Step 1-4 | Thermal treatment conditions | Temperature time condition | 150° C. 1 hour | 150° C. 1 hour | 200° C. 1 hour | 280° C. 1 hour | 200° C. 1 hour |  |
| Results of evaluation | X-ray diffraction | Presence of platinum | ○ | ○ | ○ | ○ | ○ | ○ |
|  | SEM image particle size distribution | Average particle diameter [nm] | 2.31 | 2.60 | 2.64 | 2.49 | 2.89 | 3.17 |
|  |  | Variation | 0.45 | 0.56 | 0.58 | 0.57 | 1.15 | 1.13 |
|  |  | Maximum particle diameter [nm] | 3.87 | 4.18 | 4.18 | 4.33 | 7.79 | 7.97 |
|  | Surface image/ transmission image | Surface platinum particle number/total platinum particle number [%] | 37.1 | 35.8 | 38.1 | 36.2 | 40.2 | 22.3 |
|  | 3DTEM | Percentage of platinum present in vicinity of surface of support [%] | 90< | 90< | 90< | 90< |  | 50 |

Herein, TEC10E50E manufactured by The Tanaka Kikinzoku Group was used as Comparative Example 1.

Figure 3A:
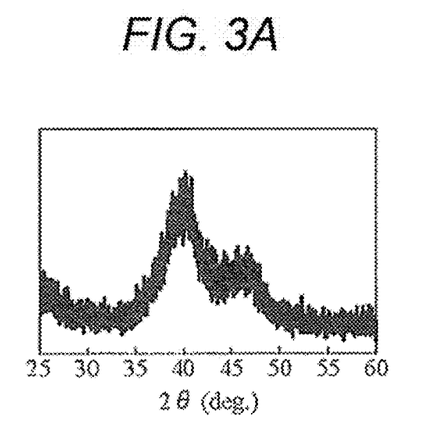
FIG. 3A shows results of powder X-ray analysis of the supported platinum catalyst according to Embodiment 9.
Figure 3B:
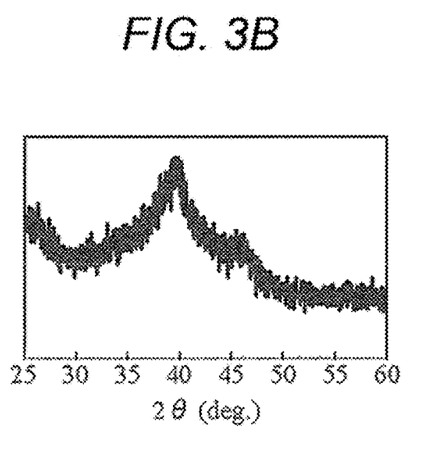
FIG. 3B shows results of powder X-ray analysis of the supported platinum catalyst according to Comparative Example 1.

Crystallization of the platinum was confirmed by powder X-ray analysis of the platinum group catalyst powder obtained in Embodiments 1 to 11 and Comparative Example 1. As a representative drawing, FIG. 3A shows results of powder X-ray analysis of the supported platinum catalyst according to Embodiment 9. FIG. 3B shows results of powder X-ray analysis of the supported platinum catalyst according to Comparative Example 1.

Since a peak derived from crystals of the platinum was observed in all of Embodiments 1 to 11, it was confirmed that the crystallized platinum particles are supported on the carbon powder, and it was confirmed that the platinum in the equivalent crystal state as the commercially available platinum-supported carbon powder of Comparative Example 1 was supported.

"O" is noted in Table 1, when the crystals were confirmed by the powder X-ray analysis.

Figure 4A:
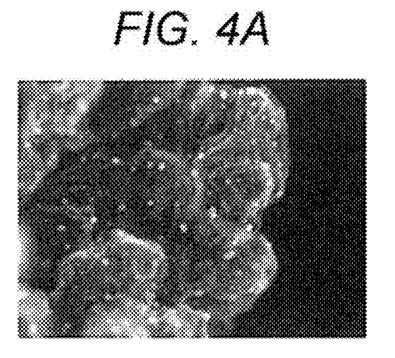
FIG. 4A shows results of scanning electron microscope observation of the supported platinum catalyst according to Embodiment 9 and FIG. 4B shows results of transmission electron microscope observation.
Figure 4B:
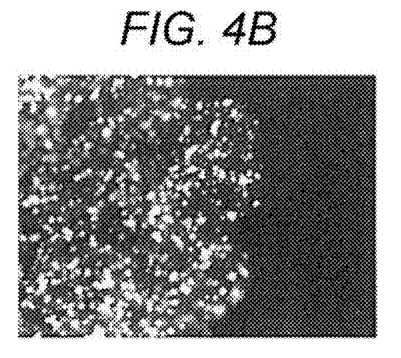
Figure 4C:
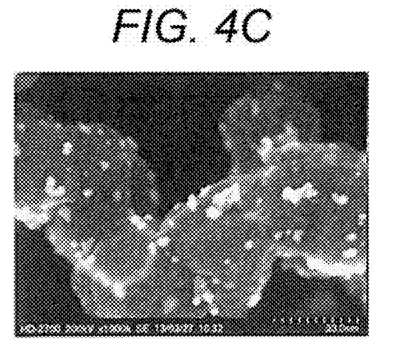
FIG. 4C shows results of scanning electron microscope observation of the supported platinum catalyst according to Comparative Example 1 and FIG. 4D shows results of transmission electron microscope observation.
Figure 4D:
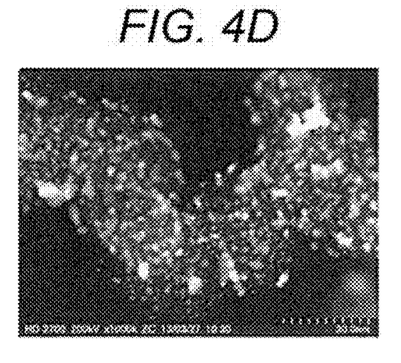

Then, evaluation of particle diameters and the number of platinum particles was performed using surface observation and transmission observation obtained by observation using a scanning electron microscope and a transmission electron microscope regarding the platinum group catalyst powder obtained in Embodiments 1 to 11 and Comparative Example 1. As representative drawings, FIG. 4A shows results of scanning electron microscope observation of the supported platinum catalyst according to Embodiment 9. FIG. 4B shows results of transmission electron microscope observation. FIG. 4C shows results of scanning electron microscope observation of the supported platinum catalyst according to Comparative Example 1. FIG. 4D shows results of transmission electron microscope observation.

An average particle diameter and a maximum value of the platinum particles and a standard deviation as a variation of the particle diameter distribution (particle size distribution) were measured using the images of the observed platinum-supported carbon powder. In addition a ratio between the number of platinum particles supported on the surface of the support obtained by the surface observation image, and the number of entirety of platinum particles including the particles inside obtained by the transmission observation image was obtained. Table 1 shows results obtained by the acquired image analysis.

As a result, it was confirmed that the platinum particles of the platinum-supported carbon powder obtained in Embodiments 1 to 10 have a smaller average particle diameter and a smaller variation of the particle diameter distribution with a variation of particle diameter distribution of the platinum particles (standard deviation) in a range of 0.42 to 0.68, compared to those of Comparative Example 1. In addition, it was also confirmed that aggregates generated in Comparative Example 1 (aggregates observed in Comparative Example 1 of FIG. 4C) do not exist. Therefore, it was confirmed that the maximum particle diameter is also smaller than that of Comparative Example 1 and the platinum-supported carbon powder having a uniform particle diameter was prepared.

In Embodiments 1 to 10, it was confirmed that the platinum-supported carbon powder having a uniform particle diameter was prepared without particularly significant effects of the types of the platinum salt and complexing agent in Step 1-1 and types of the carbon powder in Step 2-1, and it is considered that the materials described in the embodiment can be applied without limitation of the materials.

In Embodiment 11, it is considered that platinum particles having slightly non-uniform particle diameter (variation of 1.15) are generated and adsorbed to the carbon powder, due to the mixing of the reducing agent with the platinum salt solution performed without preparing the carbon powder dispersion to be obtained by dispersing the carbon powder in a solution in advance and adjusting the pH in Step 1-2. Therefore, it is important to prepare the carbon powder dispersion obtained by dispersing the carbon powder in a solution in advance and adjusting the pH, and perform the mixing with the platinum salt solution, and then, perform the reducing of the platinum. That is, it is necessary to perform the reducing of the platinum after allowing the platinum complex formed from the platinum salt and the complexing agent to adsorb to the carbon powder, in order to prepare the carbon powder on which the uniform platinum particles are supported.

Next, a presence depth of the platinum particles in the carbon support was analyzed using a three-dimensional transmission electron microscope.

From the results thereof, a presence ratio of the platinum particles with respect to a depth direction of primary particles (hereinafter, referred to as a support) of the carbon powder (cumulative volume of the platinum particles from the surface of the support in a depth direction/total volume of platinum particles supported on the support) was acquired. Since the platinum particles have own volume, the presence position of the platinum particles herein was acquired as a position where the center of the platinum particles is present.

Figure 5:
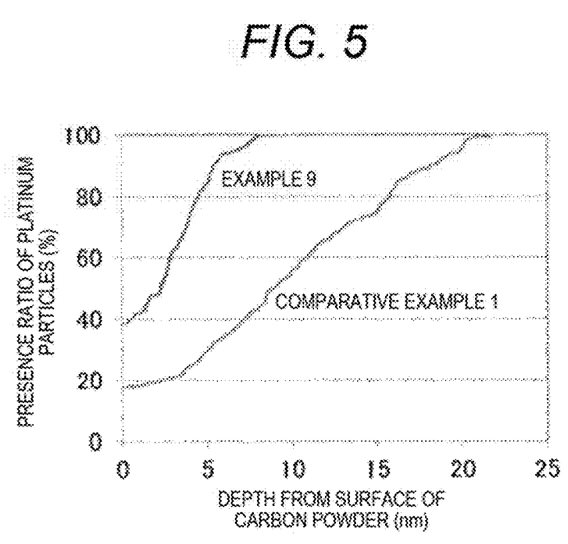
FIG. 5 is a diagram showing a presence ratio of platinum particles of the supported platinum catalyst according to Embodiment 9 and Comparative Example 1.

FIG. 5 is a diagram showing the presence ratio of the platinum particles of the supported platinum catalysts according to Embodiment 9 and Comparative Example 1. From the results thereof, it was confirmed that the presence ratio of the platinum particles in a range of 10 nm from the surface of the support (platinum presence ratio in the vicinity of the surface of the support) was approximately 50% in Comparative Example 1, whereas the ratio thereof was equal to or greater than 90% in Embodiment 9.

The platinum presence ratios in the vicinity of the surface of the support of Embodiments 1 to 10 are shown in Table 1. As a result, it was confirmed that all of the platinum presence ratios in the vicinity of the surface of the support were equal to or greater than 70% in the embodiments.

It is assumed that this is because the penetration of the platinum group complex to the inside of the pores of the carbon powder can be prevented by steric hindrances of the complexing agent particles and an interaction between the complex and the carbon particles such as an electrostatic interaction, when the platinum group complex formed from the platinum group salt and the complexing agent is adsorbed to the carbon powder. Accordingly, it is possible to increase the presence ratio of the platinum group particles present in a portion of a given depth from the surface of the carbon powder support.

Herein, in order to obtain such effects, the types of the complexing agent used in the platinum group salt solution and the types of the dispersing agent used in the carbon powder dispersion are not particularly limited, as long as the platinum group complex is adsorbed to the carbon powder. For example, the materials described in the embodiments of the invention may be applied.

In addition, a material, such as CTAB used in the embodiment, for obtaining effects of both the complexing agent and the dispersing agent can be used. As a result, it is possible to decrease the type of the materials used and expect simplification of a manufacturing control operation.

The particle diameters of the platinum group particles supported on the support of the platinum group-supported carbon powder can be set to be uniform, that is, the particle diameter distribution can be set to be narrow, by the manufacturing method of the supported platinum catalyst described in the embodiment. That is, since the platinum group complex formed from the platinum group salt and the complexing agent has a large size to a certain degree, the generation and the growth range of the platinum group particles at the time of the reduction are limited. As a result, the platinum group particles having significantly narrow particle diameter distribution of the platinum group particles which is 1.0 nm to 6.0 nm and a uniform particle diameter can be supported on the carbon powder support.

The uniformity of the particle diameters and the depth direction presence ratio can be adjusted by manufacturing conditions such as the materials such as the platinum group salt material, the complexing agent, and the carbon powder material used herein, the pH and the reaction time adjusted at the time of manufacturing, and the like.

As described above, the manufactured platinum group-supported carbon powder has two characteristics which are the improvement of uniformity of the particle diameters and the improvement of the platinum presence ratio in the support depth direction. That is, it is possible to expect an effect of efficiently using the platinum group for power generation in the electrode materials of the anode and cathode of the solid polymer fuel cell. In addition, it is also possible to manufacture the platinum group-supported carbon powder in which any one of the two characteristics is reinforced, by the adjustment of the manufacturing conditions described above.

In this disclosure, arbitrary embodiments and/or examples of the various embodiments and/or examples described above can be suitably combined with each other and each effect of the embodiments and/or examples can be exhibited.

The supported platinum catalyst is not limited to the above embodiments. For example, the supported platinum catalyst can be widely used as the electrode catalyst of the solid polymer fuel cell.

What is claimed is:

1. A supported platinum catalyst comprising:
   a carbon powder support which contains a carbon powder having pores; and
   platinum particles supported on the carbon powder support,
   wherein the platinum has a particle diameter distribution of 1.0 nm to 6.0 nm to suppress loading of particles of the platinum in the pores of the carbon powder of the carbon powder support.

2. The supported platinum catalyst of claim 1,
   wherein an average particle diameter of the platinum is from 1.5 nm to 3.5 nm.

3. The supported platinum catalyst of claim 2,
   wherein a percentage of the platinum present in a portion from a surface of the carbon powder support to a depth of 10 nm to a total amount of the platinum supported on the carbon powder support is equal to or greater than 70%.

4. The supported platinum catalyst of claim 1,
   wherein a percentage of the platinum present in a portion from a surface of the carbon powder support to a depth of 10 nm to a total amount of the platinum supported on the carbon powder support is equal to or greater than 70%.

5. A manufacturing method of a supported platinum catalyst comprising:
   generating a platinum salt solution using platinum salts and a complexing agent;
   mixing the platinum salt solution and a carbon powder dispersion in which carbon powder having pores is dispersed; and
   adding a reducing agent to a mixed solution of the platinum salt solution and the carbon powder dispersion, and reducing the platinum salts to allow platinum particles to be supported on the carbon powder,
   wherein the platinum particles have a particle diameter distribution of 1.0 nm to 6.0 nm to suppress loading of the platinum particles in the pores of the carbon powder.

6. The manufacturing method of a supported platinum catalyst of claim 5,
   wherein carbon powder and a dispersing agent are mixed and dispersed in the carbon powder dispersion.

7. The manufacturing method of a supported platinum catalyst of claim 6,
   wherein the number of carbon atoms of the complexing agent is equal to or greater than 6.

8. The manufacturing method of a supported platinum catalyst of claim 5,
   wherein the number of carbon atoms of the complexing agent is equal to or greater than 6.

9. The manufacturing method of a supported platinum catalyst of claim 5, wherein a solvent of the platinum salts solution and a solvent of the carbon powder dispersion contain water.

* * * * *